Oct. 17, 1939.    P. C. PALMER    2,176,357
WHEEL ALIGNMENT MECHANISM
Filed Nov. 9, 1938
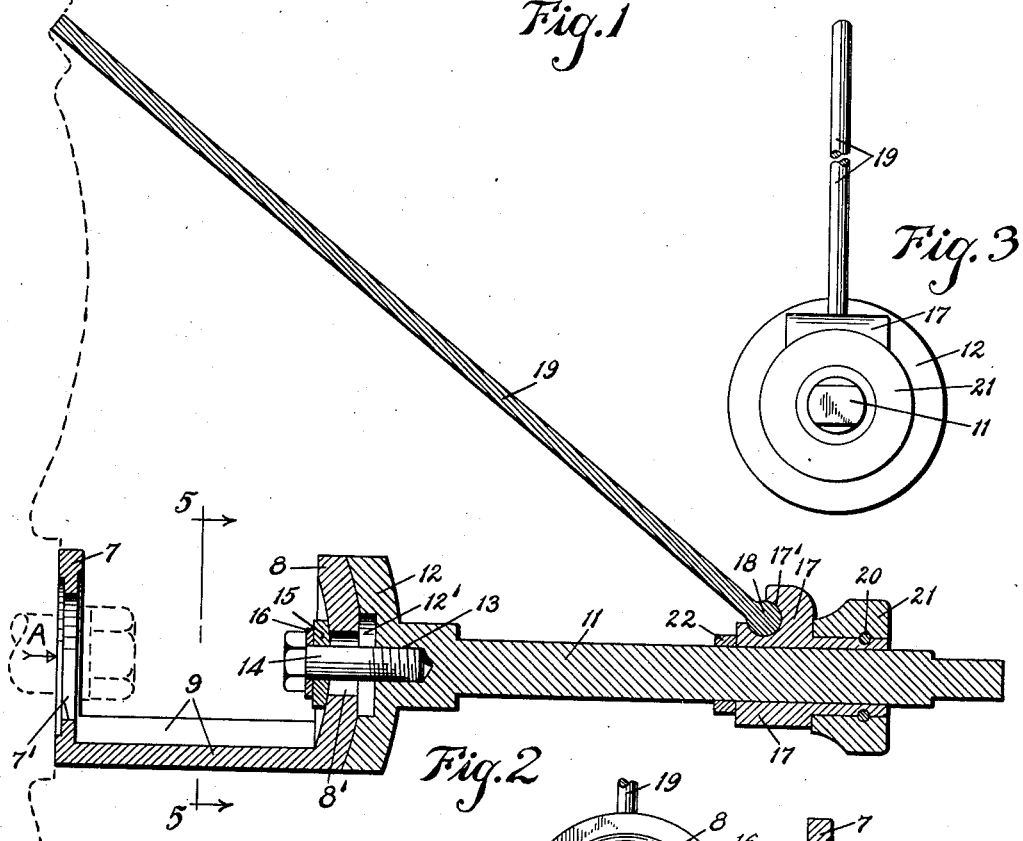
INVENTOR.
Paul C. Palmer
BY
ATTORNEY.

Patented Oct. 17, 1939

2,176,357

UNITED STATES PATENT OFFICE 2,176,357

WHEEL ALIGNMENT MECHANISM

Paul C. Palmer, Los Angeles, Calif., assignor to Robert M. Greenleaf, Los Angeles, Calif.

Application November 9, 1938, Serial No. 239,612

5 Claims. (Cl. 33—203)

My invention relates to wheel alignment mechanism, and more particularly to means designed to be attached to the wheel of a vehicle to be tested and to which means a testing mechanism can be connected.

Still more particularly, my invention provides means to be mounted on the outside of a wheel, at the axis thereof, to extend axially outwardly therefrom, with means for adjusting it to the true axial alignment of the wheel to be tested, though the axle of said wheel may be bent or out of true axial alignment.

By providing a device which can be secured to the outer side of a wheel, and in perfect axial alignment with the true axis of the wheel alignment to be tested, a wheel testing mechanism can be mounted on or connected to said axle extension and when the wheel is turned, correct indications will be made on the testing mechanism.

In order to further explain my invention, I have illustrated one practical embodiment thereon on the accompanying sheet of drawings, in which:

Figure 1 is a plan view of a device embodying my invention;

Figure 2 is a longitudinal sectional view therethrough taken on line 2—2 of Fig. 1;

Figure 3 is an end view from the right hand end of Fig. 1;

Figure 4 is an end view from the left hand end;

Figure 5 is a sectional view taken on line 5—5 of Fig. 2; and

Figure 6 is a sectional view through the outer end of the device indicating how reducing bushing can be inserted to reduce the size of the opening, being the left hand end of Fig. 2.

Referring now to the drawing in detail, my invention as here shown for illustrative purposes, comprises what I will call an adapter cage and a spindle extension shaft.

The adapter cage consists of two end portions, 7 and 8, connected with a web or body 9, of substantially the form shown. The end portion 7 is of straight disc-like form, with a central opening 7' therethrough adapted to be inserted over the end of a wheel spindle, after the nut has been removed therefrom, as indicated in light broken lines in Fig. 2. In case the opening 7' is too large, a bushing, as 10, Fig. 6, can be inserted therein before the cage is applied to the wheel spindle and secured in place.

The outer end portion 8, it will be noted is spherical in form, on a radius from the central point designated by the small arrow A, Fig. 2, both the outer and inner surfaces of said end portion 8 being of uniform spherical shape, and having a hole 8' therethrough.

A spindle extension shaft consists of a shaft 11, having at one end a head 12, of spherical form and adapted to fit snugly over the outer spherical surface of the end portion 8 of the adapter cage. The head 12 on its inner surface is provided with a clearance cavity 12' and there is also provided a bore 13, internally threaded to receive the threaded end of a bolt 14, for securing said members together, as clearly indicated in Fig. 2. A suitably formed solid washer 15, and a spring washer 16, are shown on said bolt, between its head and the end portion 8, for tightly holding said parts together in adjusted positions.

Slidably mounted on the shaft 11 is a member 17, here shown with a transverse socket 17' formed in its upper straight portion, to receive the T-end 18 of a connecting rod 19, the upper end of which is to be held against a portion of the wheel while the wheel is turned, and hereinafter again referred to.

Mounted on the hub-like extension of said member 17, and held in place with a split spring ring 20, is a hand piece or head 21, for conveniently handling the device.

Also slidably mounted on said shaft, in front of said member 17, is an indicating collar 22, which is free on said shaft.

The use and operation of the apparatus thus described may be briefly described as follows:

The spindle extension shaft 11 is adjustably secured to the adapter cage in the manner clearly indicated.

The end portion 7 of the adapter is inserted over the end of the axle or spindle for the wheel, outside of the wheel, after the end nut has been removed, as indicated, and then said nut is replaced and tightened so as to hold the adapter cage securely against the wheel hub.

When this is done the rod 19 is put in place by inserting its T-end in the socket prepared for it, being inserted endwise thereinto, and the upper end of the rod is then held against a part of the wheel, that is, against the rim or tire and held there by pressing inwardly on the head or hand piece 21. Turn the wheel slowly while holding the parts in this position. If the extension spindle shaft 11 is not in perfect alignment with the wheel spindle, the member 17 and the head portion 21 thereof will slide back and forth on the shaft 11. The purpose of the collar 22 is simply to indicate the movement of the members 17—21. If the shaft 11 is not in perfect alinement with the wheel spindle, it will be necessary to loosen the bolt 14 slightly and adjust the shaft and its head 12 on the spherical member 8, until the turning of the wheel, with the rod 19 in place, does not cause the members 17—21 to move on the shaft 11. Thus the extension shaft 11 can be adjusted to perfect alignment with the wheel spindle and secured tightly in place, and said extension shaft is then ready to receive the testing instrument, which, of course forms no part of this invention.

I do not limit this invention to the details of construction and arrangement shown to illustrate the same, except as I may be limited by the hereto appended claims, forming a part hereof.

I claim:

1. In a device of the character referred to, a member adapted to be connected to the outer end of a wheel spindle with the wheel in place thereon, an extension shaft having connecting means for connecting its inner end adjustably to the outer end of said first member, whereby it can be adjusted to axial alignment with said spindle, and a connecting rod having its free end adapted to be held against the wheel and its other end slidably connected with said shaft, whereby to slide back and forth on said shaft as said wheel is revolved, to indicate any out-of-alignment of said shaft with the wheel spindle.

2. In combination with a wheel spindle and the wheel thereon, of a member forming an extension of said wheel spindle with means for connecting it adjustably in place, whereby it can be adjusted to accurate axial alinement with said wheel spindle, a member slidably mounted on said extension and having a connecting rod therefrom to bear against said wheel at its outer part, whereby when said wheel is revolved said member will slide back and forth on said extension to indicate any out-of-alignment of said extension with said spindle.

3. In combination with a wheel spindle and wheel thereon, of a connecting member adapted to be connected with the end of said spindle, a shaft extension having its end adapted to be adjustably connected with said connecting member in axial alignment with said spindle and forming a supporting extension shaft therefrom to receive a wheel testing mechanism, a member slidably mounted on said shaft extension, a connecting rod from said member to the outer part of said wheel, whereby as said wheel is revolved said rod will move said member back and forth on said shaft extension and indicate any out-of-alignment of said shaft with said wheel axis.

4. In combination with a wheel axle and wheel thereon, of a shaft to form an extension of said wheel axle, coupling means for holding said shaft in alignment with said axle, said coupling means making said shaft adjustable to true alignment with said axle, an indicating member slidable on said shaft, a connecting rod therefrom to said wheel, whereby as said wheel is revolved it will cause said indicating member to move back and forth on said shaft for any out-of-alignment of said shaft with the true wheel axis, and a gauge member slidable on said shaft to cooperate with said indicating member to indicate the amount of the movement of said indicating member and the required adjustment of said shaft to secure true alignment, said shaft being adapted to have connected therewith a wheel testing mechanism.

5. In combination with a wheel spindle and wheel, a connecting member having one end adapted to be connected with the end of said spindle and its outer end of spherical form, a shaft having one end provided with a complementary spherical portion to adjustably interfit with the spherical outer end of said connecting member, whereby to be adjusted to true axial alignment with the spindle, and indicating member slidably mounted on said shaft, a connecting rod therefrom to the outer part of the wheel to be held thereagainst, whereby when said wheel is revolved it will cause said indicating member to move on said shaft and indicate any out-of-alignment of said shaft.

PAUL C. PALMER.